SINGLE-CORE BALANCEABLE MAGNETIC AMPLIFIER

Filed June 26, 1964

INVENTOR.
HORACE E. DARLING
BY
Curtis, Morris & Safford
ATTORNEYS

United States Patent Office 3,358,221
Patented Dec. 12, 1967

3,358,221

SINGLE-CORE BALANCEABLE MAGNETIC AMPLIFIER

Horace E. Darling, North Attleboro, Mass., assignor to The Foxboro Company, Foxboro, Mass., a corporation of Massachusetts Filed June 26, 1964, Ser. No. 378,329
19 Claims. (Cl. 323—89)

ABSTRACT OF THE DISCLOSURE

The single-core magnetic amplifier has an input winding, at least one output winding, and a load circuit including a pair of identical resistors. The load winding circuit causes load current to flow through alternate ones of the load resistors in opposite directions during successive half-cycles of load current. The load voltage is smoothed and averaged over a full cycle. This arrangement produces a stable, precisely balanced direct current output signal in which the errors due to environmental changes cancel one another during alternate half-cycles of source current. An alternating current bias winding and means for adjusting the amount of flux produced by the bias winding are included, thus providing an amplifier having variable gain. The amplifier also can be used to multiply two different input signals.

This invention relates to magnetic amplifiers. More particularly, this invention relates to "balanced" magnetic amplifiers, that is, to magnetic amplifiers utilizing opposed electrical signals to provide a stabilized output signal.

Balanced magnetic amplifiers to which the present invention relates are especially advantageous for use in industrial process measurement and control systems. In such systems it is often necessary to detect and amplify very low-level electrical error signals. As a result, it is desired to maintain a "balanced" or stabilized-output condition despite the presence of unbalancing factors such as environmental changes, e.g., changes in ambient temperature, and strain and aging changes in the magnetic cores of the amplifier.

In prior balanced magnetic amplifiers, it has been customary to use two saturable magnetic cores each carrying a load winding which conducts load current during only one half-cycle of the alternating current supply. Such amplifiers are shown, for example, in my U.S. Patent 3,102,-229. These prior amplifiers have proved to be useful because they are relatively insensitive to changes in operating conditions and maintain a balanced condition with a reasonable degree of precision. However, the ability of such amplifiers to detect very low-level signals and to maintain a balanced condition very precisely also is a function of how closely the two separate cores are "matched."

In "matching" magnetic cores, it is attempted to build and select cores which react in nearly the same way to operating and environmental changes. Such matching often entails considerable effort and expense, a problem which is greatly heightened when the size of the cores is reduced so as to enable the amplifier to operate at higher frequencies and give a correspondingly faster response.

Thus, there is a definite need to eliminate the requirements for matching cores in balanced magnetic amplifiers, since this would not only reduce the cost of manufacturing amplifiers, but also would make possible the achievement of significantly improved amplifier performance.

Accordingly, it is one object of the present invention to provide improved balanced magnetic amplifiers. More specifically, it is an object of the present invention to provide such magnetic amplifiers which are precisely balanced and in which it is not necessary to match the characteristics of multiple magnetic cores.

The foregoing objects are met by the provision of a single-core magnetic amplifier in which the load current flows through the load in only one direction during one half-cycle of alternating source current, and only in the opposite direction during the next half-cycle of source current. The load voltage is smoothed and averaged over a full cycle of source current. Any errors which might occur in the output signal due to environmental changes cancel one another during alternate half-cycles of source current.

The drawings and description that follow describe the invention and indicate some of the ways in which it can be used. In addition, some of the advantages provided by the invention will be pointed out.

Figure 1:
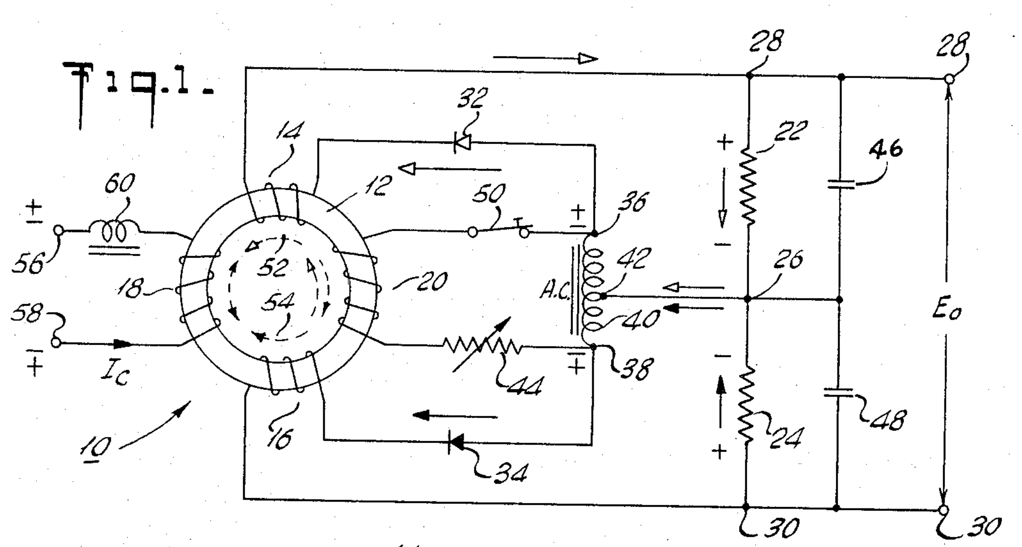
FIGURE 1 is a schematic circuit diagram of a balanced magnetic amplifier in accordance with the present invention.

The magnetic amplifier indicated generally at 10 in FIGURE 1 includes a toriodal core 12 made of saturable magnetic material, upon which are wound two identical load windings 14 and 16, a control winding 18, and a bias winding 20. Load windings 14 and 16 are connected to a pair of identical load resistors 22 and 24 which are joined together in series at point 26. One terminal of load winding 14 is connected to end terminal 28 of resistor 22, and one terminal of load winding 16 is connected to end terminal 30 of resistor 24. The other terminal of winding 14 is connected to the cathode of a diode 32, and the other terminal of winding 16 is connected to the cathode of a second diode 34. The anodes of diodes 32 and 34 are connected, respectively, to the end terminals 36 and 38 of a center-tapped secondary winding 40 of a transformer which is applied with alternating current from an A-C source (not shown). The center-tap terminal 42 of transformer secondary winding 40 is connected to the common point 26 between load resistors 22 and 24.

The operation of amplifier 10 can be understood best by first assuming that no input signal is received by control winding 18, and that a switch 50 is inserted in one of the leads to bias winding 20 and is opened so that the bias winding is not energized. Thus, the amplifier's operation first will be explained under the conditions where there is no bias and no control signal.

During each positive half-cycle of supply current, i.e., a half-cycle in which the polarity of terminal 36 of transformer secondary 40 is positive with respect to terminal 38, diode 32 is forward-biased and conducts current through winding 14 in the direction indicated by the hollow-headed arrows. This current flows through winding 14, through load resistor 22 and is returned to the center-tap 42 of transformer secondary winding 40. The current flow through winding 14 develops in core 12 a magnetic flux flowing in the direction indicated by dashed arrow 52. Assuming that voltages which increase from terminal 30 to terminal 28 are positive, a positive voltage pulse is developed across resistor 22 by this flow of current through it.

During the next half-cycle of source current, terminal 38 of secondary winding 40 is positive with respect to terminal 36, diode 34 is forward-biased and passes current, in the direction indicated by the solid-headed arrows, through load winding 16, load resistor 24, and is returned to center-tap 42 of secondary winding 40. The load current through load winding 16 develops a magnetic flux flowing through core 12 in a direction indicated by arrow 54 which is opposite to the direction of flow of flux developed by winding 14. The current flow through resistor 24 causes an output voltage signal to be developed across it which is opposite in polarity to the signal developed across resistor 22 during the first half-cycle of source current. The magnitude of the current which flows through resistors 22 and 24 depends upon whether the voltage supplied by each half of secondary winding 40 is sufficient to cause core 12 to saturate during each half-cycle of source current, and the time in each cycle at which such saturation occurs.

Regardless of whether saturation occurs, if there is substantial identity between the electrical characteristics of diodes 32 and 34, of load windings 14 and 16, of load resistors 22 and 24, and of capacitors 46 and 48, the load voltage developed during one half-cycle of source current will be substantially identical to that developed during the next half-cycle.

Smoothing capacitors 46 and 48 produce an output voltage signal across terminals 28 and 30 which is the approximate average value of the sum of the voltages developed across resistors 22 and 24. Since the voltages developed across resistors 22 and 24 are substantially identical but are opposite in polarity, the average value of the sum of the voltages across the two load resistors is zero. Therefore, with no signal input to control winding 18, and with switch 50 open, and with the various circuit components matched as indicated above, the output signal at terminals 28 and 30 is substantially zero.

Moreover, this zero-output of balanced condition is maintained with a high degree of precision in spite of environmental changes. For example, environmental changes such as aging, temperature changes, and physical strain on core 12 are believed to change the permeability of the core material. The signals resulting from such changes sometimes are known as "noise" signals. Such "noise" signals do not significantly affect the balance or "null" condition of the present amplifier. Since the flux developed by load winding 14 flows in the same magnetic path as the flux developed by load winding 16, the change in characteristics of the core affects the voltage developed across resistor 22 on one half-cycle in much the same way that it affects the voltage developed across resistor 24 in the next half-cycle. By making these load voltages oppose each other, there is no net change in the full-cycle average value of the output signal despite changes in the individual half-cycle signals due to the development of "noise" signals, and the amplifier will remain in its balanced condition.

The operation of amplifier 10 now will be explained under the conditions where switch 50 is open and a D.C. input signal is supplied to control winding 18 at input terminals 56 and 58 through an impedance such as choke 60. The input signal may be of either positive or negative polarity. If it is of positive polarity, that is, if it is of a polarity such that the voltage at terminal 56 is positive with respect to that at terminal 58, a flux will be developed by winding 18 in a direction aiding the flux developed by load winding 14 and opposing that developed by load winding 16.

Assuming that the flux developed by load windings 14 and 16 is sufficient without a bias or control flux to saturate core 12 during each half-cycle, the control flux developed by winding 18 causes the core to saturate earlier during positive half-cycles of load current and later during negative half-cycles. Thus, the voltage developed across resistor 22 is larger than that developed across resistor 24, and the resulting voltage wave has a positive D-C average value. Capacitors 46 and 48 average and smooth this voltage wave into a steady, amplified D-C output signal $E_o$.

If the D-C input signal has a negative polarity, that is, if terminal 58 is positive with respect to terminal 56, winding 18 develops a flux in core 12 which opposes that developed by load winding 14 and aids that developed by load winding 16. Hence, the core 12 saturates earlier during negative half-cycles of source current and later in the positive half-cycles, thus giving a negative D-C output signal $E_o$.

The addition of an alternating flux from A-C bias winding 20 by closing switch 50 alters the gain of the amplifier. Winding 20, when wound and connected as shown in FIGURE 1, produces a flux in core 12 which is in phase with and aids the flux developed by both load windings 14 and 16. The amount of flux developed by winding 20 depends upon the setting of variable resistor 44. By varying the setting of resistor 44 the gain of the amplifier 10 can be varied from that obtained when there is substantially no A-C bias flux, to the increased gain obtained when winding 20 supplies a large amount of flux.

By reversing the connection of winding 20 to terminals 36 and 38, the flux developed by winding 20 is made to oppose flux developed by both load windings 14 and 16. In this manner the gain of the amplifier 10 can be reduced. The amount of gain reduction attainable can be changed by varying the setting of variable resistor 44.

Figure 2:
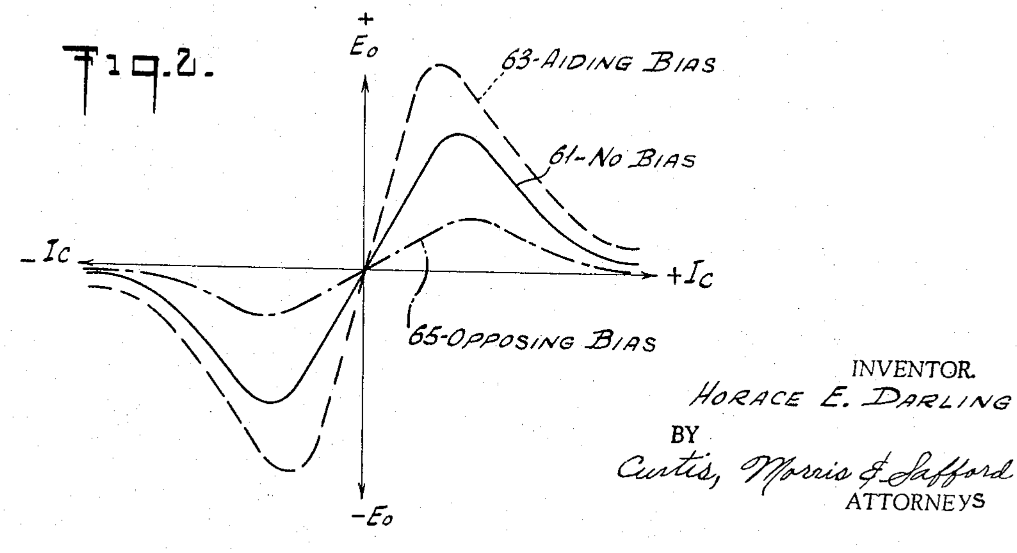
FIGURE 2 is a set of curves describing the operation of the arrangement shown in FIGURE 1.

Thus, the amplifier 10 shown in FIGURE 1 is a variable-gain, balanced magnetic amplifier. The variability of the amplifier's gain is illustrated in FIGURE 2, which shows a family of curves indicating the relationship between the control current $I_c$ and the output voltage $E_o$ of the amplifier for various values of bias current. Solid-line curve 61 depicts the curve for the condition in which no bias is applied by winding 20. Dashed-line curve 63 shows a similar curve resulting when winding 20 is connected as shown in FIGURE 1 so that its flux aids the flux developed by windings 14 and 16. Curve 65 shows another curve resulting when the connection of bias winding 20 to terminals 36 and 38 is reversed, so that the flux developed by winding 20 opposes that developed by load windings 14 and 16. Variation of the setting of variable resistor 44 will produce other curves similar to but displaced from curves 61, 63 and 65.

Amplifier 10 can be used advantageously as a multiplier of two or more electrical signals. One of the signals to be multiplied is applied to control winding 18, and the other signal to bias winding 20. The resulting output signal will have a magnitude which is a function of the product of the magnitudes of the control winding and bias winding signals. The level of the bias winding signal may be set by adjustment of resistor 44, or by providing a separate signal source (not shown) connected in series with or replacing resistor 44 and transformer secondary winding 40. Thus, amplified 10 can be used as a relatively simple, low-cost and effective multiplier.

The advantages of the circuit shown in FIGURE 1 are many. As explained above, the stability of its balanced condition does not depend upon the tedious matching of electrical characteristics of two or more separate magnetic cores. Since the core 12 provides only one magnetic path for flow of the flux developed by load windings 14 and 16, and since the effect of any changes in the magnetic material in that single path is compensated for by balancing the load voltages developed during alternate half-cycles of source current, it is possible for the characteristics of core 12 to vary over a considerable range without affecting the balanced condition of the amplifier 10. The matching of the halves of center-tap secondary winding 40, and the matching of diodes 32 and 34, load windings 14 and 16, resistors 22 and 24, and capacitors 46 and 48 is relatively simple and inexpensive. Thus, a precisely balanced, stable magnetic amplifier can be produced at relatively low cost.

Further advantages result from the elimination of the need to match magnetic cores. For example, in prior balanced magnetic amplifiers it often is necessary to use expensive laminated toroidal cores in order to allow effective matching of core characteristics. It is often desirable to operate such magnetic amplifiers at high frequencies so as to enable them to respond faster to input signal changes. However, in order to do this, the magnetic cores must be made small, the required size of the cores being an inverse function of operating frequency. Such small laminated cores are extremely expensive. However, tape-wound toriodal cores of a similar size are relatively inexpensive. Since the amplifier of the present invention requires no core-matching, a tape-wound core can be used, thus providing a fast-responding, precisely balanced, and relatively inexpensive amplifier.

As was pointed out above, amplifier 10 provides a relatively simple, low-cost and effective means for multiplying electrical signals.

Figure 3:
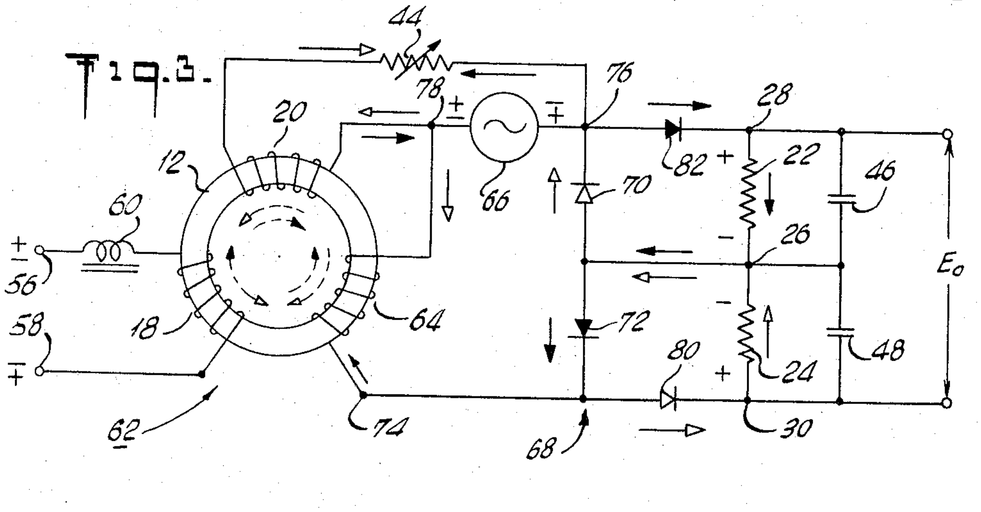
FIGURE 3 is a schematic circuit diagram of another balanced magnetic amplifier in accordance with the present invention.

Referring now to FIGURE 3, the balanced magnetic amplifier 62 differs from amplifier 10 mainly in that it has only one load winding 64, and has no center-tapped transformer. An alternating current source 66 is connected in series with load winding 64 and the amplifier load circuit, and A-C bias winding 20 is connected to A-C source 66 through variable bias resistor 44.

Load current is directed through load resistors 22 and 24 in the same sequence and directions as in amplifier 10 by means of a diode network indicated generally at 68. Diode network 68 includes a diode 70 connected in parallel with load resistor 22, and another diode 72 connected in parallel with load resistor 24. The cathode of diode 72 is connected to terminal 74 of load winding 64, and the cathode of diode 70 is connected to terminal 76 of power source 66. The anodes of diodes 70 and 72 are connected together and to junction 26 between resistors 22 and 24.

The operation of this circuit arrangement is as follows. During positive half-cycles of source current, that is, when terminal 78 of source 66 is positive with respect to terminal 76, current flows in the path indicated by the open-headed arrows through load resistor 24. Diode 72 is reverse-biased and does not conduct, but diode 70 is forward-biased and, if its forward resistance is low relative to the resistance of resistor 24, diverts current from resistor 24 around resistor 22 and back to source 66. Thus, diode 70 causes load current to flow only through resistor 24 during positive half-cycles of source current.

During negative half-cycles, load current flows in the direction indicated by the solid-headed arrows through load resistor 22, diode 72 and load winding 64 back to source 66. Thus, during negative half-cycles, diode 72 serves to by-pass load current around resistor 24 and allows current to flow only through resistor 22.

From the foregoing it can be seen that amplifier 62, like amplifier 10 of FIGURE 1, provides load current flow through alternate ones of load resistors 22 and 24 on alternate half-cycles of the source current. Since there is only one load winding wound upon core 12, the flux developed by the load winding always flows in the same magnetic path. Hence, changes in the electrical characteristics of core 12 will not unbalance the amplifier since the changes are compensated for by the arrangement whereby the voltages developed across resistors 22 and 24 oppose one another.

Diode network 68 also includes a pair of diodes 80 and 82 connected in series with source 66, load winding 64, and the load resistors. The cathode of diode 80 is connected to end terminal 30 of resistor 24 and the anode is connected to the cathode of diode 72. Similarly, the cathode of diode 82 is connected to end terminal 28 of load resistor 22, and the anode of diode 80 is connected to the cathode of diode 70. Diode 82 serves to prevent current from flowing through load resistor 22 during positive half-cycles, and diode 80 blocks the flow of load current through load resistor 24 during negative half-cycles of load current. Diodes 80 and 82 are used in instances where the resistance of resistors 22 and 24 is relatively low and is of the same order of magnitude as the forward resistance of diodes 70 and 72. Thus, in such circumstances, diodes 80 and 82 prevent the current which has just passed through one of the load resistors from dividing at point 26 between either diode 70 or 72 and the other load resistor.

Some advantages of amplifier 62 are that it requires only one load winding, and does not require a center-tapped secondary transformer. Thus, at least two possible sources of unbalance have been avoided. As in amplifier 10, variation of the setting of resistor 44 varies the gain of amplifier 62. Also, as in amplifier 10, resistors 22 and 24 and capacitors 46 and 48 should be matched for best results. Similarly, diodes 70 and 72 should be matched, as should diodes 80 and 82, if the latter are used.

The above description of the invention is intended to be illustrative and not limiting. Various changes or modifications in the embodiments described may occur to those skilled in the art and these can be made without departing from the spirit or scope of the invention as set forth in the claims.

I claim:

1. A balanced magnetic amplifier capable of amplifying relatively small electrical input signals into relatively large electrical output signals, said amplifier comprising, in combination; a saturable magnetic core; load winding means, said load winding means including at least one load winding wound upon said core; a pair of impedance elements forming a load circuit; electrical circuit means for connecting said impedance elements and said load winding means to an alternating current source, for conducting alternating source current, during one half-cycle of said source current, through said load winding means and through only one of said impedance elements, for conducting said source current, during the next half-cycle of said current, through said load winding means and through only the other of said impedance elements, and for connecting said impedance elements together in a manner such that the electrical signal developed in said one element by the flow of said source current through it opposes the signal developed in said other impedance element by the flow of said source current through it, said load winding means and said core being associated with one another in a manner such that the magnetic path taken through said core by flux developed by said load winding means during one half-cycle of said source current is substantially the same as the magnetic path taken through said core by flux developed by said load winding means during the next half-cycle of said source current; and a control winding wound on said core, said control winding being adapted to receive said input signals and modify the flux in said core in accordance with said input signals.

2. Apparatus as in claim 1 including a bias winding wound upon said core and energized by said alternating current source, and variable impedance means for controlling the magnitude of current flow through said bias winding.

3. A magnetic amplifier capable of amplifying relatively small electrical input signals into relatively large electrical output signals, said amplifier comprising, in combination; a saturable magnetic core; load winding means, said load winding means including at least one load winding wound upon said core; a pair of impedance elements forming a load circuit; electrical circuit means for connecting said impedance elements and said load winding means to an alternating current source, for conducting alternating source current, during one half-cycle of said source current, through said load winding means and through only one of said impedance elements, for conducting said source current, during the next half-cycle of said current, through only said load winding means and through the other of said impedance elements, and for connecting said impedance elements together in a manner such that the electrical signal developed in said one element by the flow of said source current through it opposes the signal developed in said other impedance element by the flow of said source current through it, said load winding means and said core being associated with one another in a manner such that the magnetic path taken through said core by flux developed by said load winding means during one half-cycle of said source current is substantially the same as the magnetic path taken through said core by flux developed by said load winding means during the next half-cycle of said source current; a control winding wound on said core, said control winding being adapted to receive said input signals and modify the flux in said core in accordance with said input signals; output terminal means; and averaging means for producing an electrical output signal having the approximate average value of said electrical signal developed across said load circuit for each full cycle of said source current, and for delivering said output signal to said output terminal means.

4. Apparatus for amplifying an electrical input signal, said apparatus comprising, in combination; a saturable magnetic core; a load winding wound upon said core; a pair of series-connected resistors, the end terminals of said series-connected resistor pair constituting output terminals for said amplifier; an alternating current source; first and second diodes with their anodes connected together, the common point between said anodes being connected to the common point between said resistors, and the cathodes of said diodes each being connected to one of said end terminals of said series-connected resistor pair, said alternating current source being connected between the cathode of one of said first and second diodes and one end terminal of said load winding, the other end terminal of said load winding being connected to the cathode of the other of said first and second diodes; and a control winding wound upon said core and adapted to receive an input signal and develop in said core flux in an amount dependent upon the magnitude of said input signal.

5. Apparatus as in claim 4 including a bias winding wound upon said core and energized by said alternating current source, and a variable impedance element connected in series with said bias winding.

6. Apparatus for amplifying an electrical input signal, said apparatus comprising, in combination; a saturable magnetic core; a load winding wound upon said core; a pair of series-connected resistors, the end terminals of said series-connected resistor pair constituting output terminals for said amplifier; an alternating current source; first and second diodes with their anodes connected together, the common point between said anodes being connected to the common point between said resistors; third and fourth diodes, each having its anode connected to the cathode of one of said first and second diodes and its cathode connected to one of said end terminals of said series-connected resistor pair, said alternating current source being connected between the cathode of one of said first and second diodes and one end terminal of said load winding, the other end terminal of said load winding being connected to the cathode of the other of said first and second diodes; and a control winding wound upon said core and adapted to receive an input signal and develop in said core flux in an amount dependent upon the magnitude of said input signal.

7. Apparatus for amplifying an electrical input signal, said apparatus comprising, in combination; a saturable magnetic core; a load winding wound upon said core; a pair of series-connected resistors, the end terminals of said series-connected resistor pair constituting output terminals of said amplifier; an alternating current source; first and second diodes with their anodes connected together, the common point between said anodes being connected to the common point between said resistors, and the cathodes of said diodes each being connected to one of said end terminals of said series-connected resistor pair, said alternating current source being connected between the cathode of one of said first and second diodes and one end terminal of said loading winding, the other end terminal of said load winding being connected to the cathode of the other of said first and second diodes; a control winding wound upon said core and adapted to receive an input signal and develop in said core flux in an amount dependent upon the magnitude of said input signal; and averaging means connected to said series-connected resistor pair for producing at said output terminals an electrical signal having a value equal to the approximate average value, taken over a full cycle of source current, of the electrical signal appearing across said end terminals of said series-connected resistor pair.

8. Apparatus as in claim 7 including third and fourth diodes each connected in series between one of said first and second diodes and one end terminal of said series-connected resistor pair, each of said third and fourth diodes having its anode connected to the cathode of one of said first and second diodes and its cathode connected to one of said end terminals of said series-connected resistor pair.

9. Apparatus as in claim 7 in which said averaging means constitutes two capacitors each of which is connected in parallel with one of said resistors, and including a bias winding wound upon said core and energized by said alternating current source.

10. Apparatus for amplifying an electrical input signal, said apparatus comprising, in combination; saturable magnetic core means defining a magnetic flux path; means associated with said core means for receiving said electrical input signal and developing in said flux path magnetic flux in an amount dependent upon the magnitude of said input signal; an electrical load circuit including a pair of impedance elements connected to one another; means associated with said core means, adapted to be energized by an alternating current source and connected to said load circuit for developing across said load circuit an electrical signal whose magnitude is dependent upon the magnitude of said input signal, and for conducting load current controlled by the magnetic flux in said flux path through said load circuit in one direction during a first half-cycle of said source current and in the opposite direction during the next half-cycle of source current, said load current flowing through only one of said impedance elements during a particular half-cycle of source current; output terminal means; and averaging means for producing an output signal having the approximate average value of said electrical signal developed across said load circuit for each full cycle of said source current, and for delivering said output signal to said output terminal means.

11. Apparatus as in claim 10 including means associated with said core means for developing in said flux path an alternating bias flux having an adjustable magnitude and a fixed phase relationship with respect to said source current.

12. Apparatus for amplifying an electrical input signal, said apparatus comprising, in combination; saturable magnetic core means defining a magnetic flux path; means associated with said core means for receiving said electrical input signal and developing in said flux path magnetic flux in an amount dependent upon the magnitude of said input signal; an electrical load circuit including a pair of impedance elements connected to one another; means associated with said core, adapted to be energized by an alternating current source and connected to said load circuit for developing across said load circuit an electrical signal whose magnitude is dependent upon the magnitude of said input signal, and for conducting load current controlled by the magnetic flux in said flux path through one of said impedance elements in one direction during a first half-cycle of said source current and through the other of said impedance elements in the opposite direction during the next half-cycle of source current, said load current flowing through only one of said impedance elements during a particular half-cycle of source current; output terminal means; and averaging means for producing an output signal having the approximate average value of said electrical signal developed across said load circuit for each full cycle of said source current, and for delivering said output signal to said output terminal means.

13. A magnetic amplifier capable of amplifying relatively small electrical input signals into relatively large electrical output signals, and being capable of preventing the provision of any substantial output signal when no input signal is received by said amplifier, said amplifier comprising, in combination; a saturable magnetic core; a pair of load windings each of which is wound upon said core; a pair of series-connected load impedance elements; electrical circuit means including a pair of rectifiers for connecting said load impedance elements and said load windings to an alternating current source, for conducting alternating source current, during one half-cycle of said source current, through only one of said load windings and through only one of said impedance elements, for conducting said source current, during the next half-cycle of said current, through only the other of said load windings and through only the other of said impedance elements, and for conducting said source current through said windings and said impedance elements in a manner such that the electrical signal developed in said one element by the flow of said source current through it opposes the signal developed in said other impedance element by the flow of said source current through it, said load windings being wound on said core in a manner such that the flux path taken through said core by flux developed by one of said load windings during one half-cycle of said source current is substantially the same as the flux path taken through said core by flux developed by said load winding means during the next half-cycle of said source current; and a control winding wound on said core, said control winding being adapted to receive said input signals and modify the flux in said core in accordance with said input signals.

14. A magnetic amplifier capable of amplifying relatively small electrical input signals into relatively large electrical output signals, and being capable of providing and maintaining substantially zero output signal when no input signal is received by said amplifier, said amplifier comprising, in combination; a saturable magnetic core; a pair of load windings wound upon said core; a pair of series-connected resistors, the end terminals of said series-connected resistor pair constituting output terminals for said amplifier; an alternating current source; a transformer energized by said source and having a center-tapped secondary winding; a pair of diodes, each end terminal of said secondary winding of said transformer being connected through one of said diodes to one terminal of one of said load windings, the center-top terminal of said transformer secondary winding being connected to the junction between said resistors, the other terminal of each of said load windings being connected to one of the end terminals of said series-connected resistor pair, said diodes being connected to said transformer secondary winding in a manner such that each of said diodes conducts source current through the load winding to which it is attached substantially without impedances only during alternate half-cycles of said source current, the half-cycles during which one of said diodes conducts being different from the half-cycles during which the other of said diodes conducts, said load windings being wound on said core in a direction such that they develop flux in opposite directions in said core; and a control winding wound upon said core.

15. A magnetic amplifier capable of amplifying relatively small electrical input signals into relatively large electrical output signals, and being capable of providing and maintaining substantially zero output signal when no input signal is received by said amplifier, said amplifier comprising, in combination; a saturable magnetic core; a pair of load windings wound upon said core; a pair of series-connected resistors, the end terminals of said series-connected resistor pair constituting output terminals for said amplifier; an alternating current source; a transformer energized by said source and having a center-tapped secondary winding; a pair of diodes, each end terminal of said secondary winding of said transformer being connected through one of said diodes to one terminal of one of said load windings, the center-tap terminal of said transformer secondary winding being connected to the junction between said resistors, the other terminal of each of said load windings being connected to one of the end terminals of said series-connected resistor pair, said diodes being connected to said transformer secondary winding in a manner such that each of said diodes conducts source current through the load winding to which it is attached substantially without impedance only during alternate half-cycles of said source current, the half-cycles during which one of said diodes conducts being different from the half-cycles during which the other of said diodes conducts, said load windings being wound on said core in a direction such that they develop flux in opposite directions in said core; control winding wound upon said core; and averaging means connected to said series-connected resistor pair for producing at said output terminals an electrical signal having a value equal to the approximate average value, taken over a full cycle of source current, of the electrical signal appearing across said end terminals of said series-connected resistor pair.

16. Apparatus as in claim 15 in which said averaging means constitutes two capacitors each of which is connected in parallel with one of said resistors, and including a bias winding wound upon said core and energized by said alternating current source, and a variable-impedance circuit element connected in series with said bias winding.

17. A magnetic amplifier capable of amplifying relatively small electrical input signals into relatively large electrical output signals, and being capable of preventing the provision of any substantial output signal when no input signal is received by said amplifier, said amplifier comprising, in combination; a saturable magnetic core; a pair of load windings each of which is wound upon said core; an electrical load; electrical circuit means for connecting said load and said load windings to an alternating current source, for conducting alternating source current, during one half-cycle of said source current, through only one of said load windings and through said load in one direction, and for conducting said source current, during the next half-cycle of said current through only the other of said load windings and through said load in the opposite direction, said load windings being wound on said core in a manner such that the flux path taken through said core by flux developed by one of said load windings during one half-cycle of said source current is substantially the same as the flux path taken through said core by flux developed by said load winding means during the next half-cycle of said source current; and a control winding wound on said core, said control winding being adapted to receive said input signals and modify the flux in said core in accordance with said input signals.

18. Apparatus as in claim 17 including a third winding wound on said core and connected to said source to supply bias flux to said core, and a variable impedance connected to said third winding for adjusting the amount of flux supplied by said third winding.

19. Apparatus as in claim 18 in which said variable impedance is a variable resistor connected in series with said third winding.

References Cited

UNITED STATES PATENTS

| | | | |
|---|---|---|---|
| 2,752,429 | 6/1956 | Hanson | 323—89.11 |
| 2,988,689 | 6/1961 | Jackson | 323—56 |
| 3,016,493 | 1/1962 | Darling | 330—8 |
| 3,110,857 | 11/1963 | Lafuze | 323—89 |

JOHN F. COUCH, *Primary Examiner.*

A. D. PELLINEN, *Assistant Examiner.*

UNITED STATES PATENT OFFICE
CERTIFICATE OF CORRECTION

Patent No. 3,358,221 December 12, 1967

Horace E. Darling

It is hereby certified that error appears in the above numbered patent requiring correction and that the said Letters Patent should read as corrected below.

Column 7, line 9, strike out "only" and insert the same after "through" in line 10, same column 7.

Signed and sealed this 11th day of March 1969.

(SEAL)
Attest:

Edward M. Fletcher, Jr.
Attesting Officer

EDWARD J. BRENNER
Commissioner of Patents